(12) United States Patent
Suzuki et al.

(10) Patent No.: US 12,387,749 B2
(45) Date of Patent: Aug. 12, 2025

(54) SPINDLE MOTOR

(71) Applicant: MINEBEA MITSUMI Inc., Nagano (JP)

(72) Inventors: Akihiko Suzuki, Kitasaku-gun (JP); Makoto Chonan, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/415,795

(22) Filed: Jan. 18, 2024

(65) Prior Publication Data
US 2024/0257831 A1 Aug. 1, 2024

(30) Foreign Application Priority Data
Jan. 27, 2023 (JP) .................. 2023-011199

(51) Int. Cl.
G11B 33/02 (2006.01)
C09D 5/44 (2006.01)
G11B 5/31 (2006.01)
G11B 5/00 (2006.01)

(52) U.S. Cl.
CPC ............ *G11B 5/3106* (2013.01); *C09D 5/443* (2013.01); *G11B 5/3163* (2013.01); *G11B 33/022* (2013.01); *G11B 2005/0021* (2013.01)

(58) Field of Classification Search
None
See application file for complete search history.

(56) References Cited

U.S. PATENT DOCUMENTS

| 4,001,101 A * | 1/1977 | Bosso .................. C08G 59/64 |
| | | 523/445 |
| 6,010,774 A * | 1/2000 | Kadokura ............. C09D 5/448 |
| | | 204/508 |
| 2019/0139579 A1* | 5/2019 | Yoneda ................. G11B 23/38 |
| 2022/0068305 A1* | 3/2022 | Showa ................. G11B 25/043 |
| 2024/0339131 A1* | 10/2024 | Suzuki ................. G11B 33/12 |
| 2025/0070602 A1* | 2/2025 | Suzuki .................... H02K 7/14 |

FOREIGN PATENT DOCUMENTS

| JP | 2002294172 A * | 10/2002 | ........... C09D 5/4457 |
| JP | 5049017 B2 | 10/2012 | |

OTHER PUBLICATIONS

Yakata et al., "Smear and Decomposition Mechanism of Magnetic Disk PFPE Lubricant Film by Laser Heating in Air and Helium Conditions", Tribology Online, vol. 15, No. 3 (2020) pp. 186-193, ISSN 1881-2198, DOI 10.2474/trol.15.186 (cited on p. 1 of the specification).

* cited by examiner

*Primary Examiner* — William J Klimowicz
(74) *Attorney, Agent, or Firm* — Chrisman Gallo Tochtrop LLC

(57) ABSTRACT

Provided are a base member for a heat-assisted magnetic recording disk drive apparatus, the base member including: a coating film coating at least a part of the base member, in which the coating film is an overbaked epoxy resin-containing electrodeposition coating film, a spindle motor including the base member, and a method for manufacturing the base member.

5 Claims, 6 Drawing Sheets

SPINDLE MOTOR

CROSS-REFERENCE TO RELATED APPLICATIONS

This application claims the benefit of priority to Japanese Patent Application Number 2023-011199 filed on Jan. 27, 2023. The entire contents of the above-identified application are hereby incorporated by reference.

TECHNICAL FIELD

The disclosure relates to a base member of an electronic apparatus such as a heat-assisted magnetic recording (HAMR) disk drive apparatus, and a spindle motor using the base member.

BACKGROUND

A base member (also referred to as a base plate) of a disk drive apparatus is generally manufactured by die casting of aluminum, and a surface of the base member is subjected to electrodeposition coating in order to avoid generation of dust or the like from the surface of the base member.

The electrodeposition coating for the base member is applied not only to a conventional disk drive apparatus but also to a sealed disk drive apparatus including a low-density gas such as helium gas sealed inside the apparatus, a disk drive apparatus employing a heat-assisted magnetic recording (HAMR) system as a next-generation recording technology, and the like (JP 5049017 A, Smear and Decomposition Mechanism of Magnetic Disk PFPE Lubricant film by Laser Heating in Air and Helium Conditions (Tribology online Vol. 15, No. 3 (2020) 186 to 193.) or the like).

Smear and Decomposition Mechanism of Magnetic Disk PFPE Lubricant film by Laser Heating in Air and Helium Conditions (Tribology online Vol. 15, No. 3 (2020) 186 to 193.) further discloses that the presence of oxygen is useful for decomposition of organic impurities (for example, the above-mentioned volatilized components) on a recording disk in a disk drive apparatus where the tip temperature of a read/write head reaches several hundred of ° C. as in the HAMR system, the organic impurities causing read/write errors.

SUMMARY

As disclosed in Smear and Decomposition Mechanism of Magnetic Disk PFPE Lubricant film by Laser Heating in Air and Helium Conditions (Tribology online Vol. 15, No. 3 (2020) 186 to 193.), although the decomposition of the organic impurities can be expected due to the presence of oxygen in the HAMR disk drive apparatus, organic compounds present in the apparatus may be oxidized at high temperatures before the decomposition of the impurities, and this oxidation may consume the oxygen present in the disk first.

The disclosure has been made in view of the above circumstances, and an object of the disclosure is to provide a base member capable of, particularly in a heat-assisted magnetic recording disk drive apparatus, suppressing consumption of oxygen inside the apparatus.

An aspect of the disclosure relates to a base member for a heat-assisted magnetic recording disk drive apparatus, the base member including: a coating film coating at least a part of the base member, in which the coating film is an epoxy resin-containing electrodeposition coating film overbaked.

The disclosure relates to a spindle motor including the base member and a heat-assisted magnetic recording disk drive apparatus including the spindle motor.

The disclosure further relates to a method for manufacturing the base member.

BRIEF DESCRIPTION OF DRAWINGS

FIGS. 1A and 1B are schematic views each for explaining an example of a base member according to the disclosure, wherein FIG. 1A is a plan view and FIG. 1B is a perspective view.

DESCRIPTION OF EMBODIMENTS

Figure 1A:
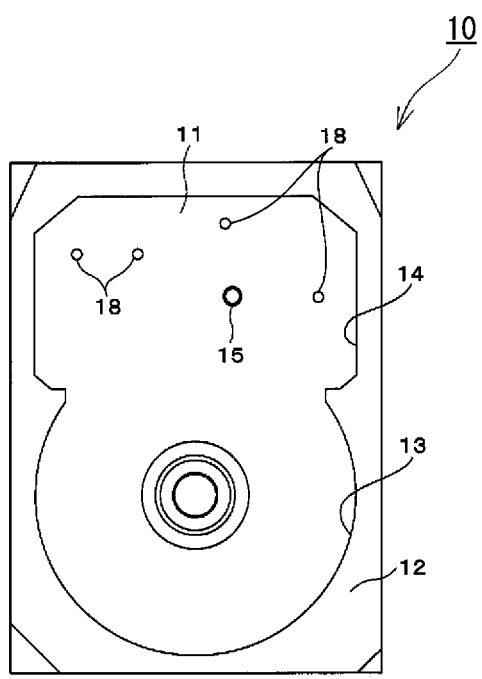

A cause of occurrence of read/write errors in a hard disk drive (HDD) includes volatilization of a lubricant component, for example, base oil, enclosed in a bearing incorporated in a spindle motor of a disk drive apparatus. When the volatilized base oil is cooled, condensed on the surface of a magnetic disk or a magnetic head, and adheres to the surface of the magnetic disk or the magnetic head as a liquid or a solid, the magnetic disk and the magnetic head are attracted to each other and normal reading and writing are not possible, resulting in a cause of read and write errors. Therefore, proposals have been made to suppress the volatilization of a lubricant component (generation of outgas or the like) considered to be one cause of read/write errors of the HDD in a lubricant used for an actuator or a spindle motor of the HDD.

However, even though the volatilization of a generally used lubricant component is suppressed, the volatilization itself is not eliminated. In particular, with the improvement in recording density in recent years, the fly height (distance between a magnetic head and a disk) has been reduced to about several nanometers. This considers that a negative pressure state is formed between the magnetic head and the disk and a surrounding gas is directed between the magnetic head and the disk and is compressed. The compressed gas may be condensed, and a trace amount of volatile components may be liquefied. In recent years, with an increase in the recording capacity per HDD, the number of disks in the apparatus has increased, and disk drive apparatuses having nine or more disks each having a diameter of 3.5 inches have been put on the market. In such an apparatus, a spatial volume within the apparatus is further reduced. In such an environment having a small spatial volume and a fly height on the order of several nanometers, even a trace amount of contamination may lead to read/write errors.

A disk drive apparatus including an internal space filled with a gas (for example, helium or the like) having a lower density than air has also started to spread. In such a disk drive apparatus, the air pressure inside the apparatus may be less than one atmosphere. This makes it more difficult to suppress volatilization of a lubricant component.

In particular, in the case of an HDD employing a heat-assisted magnetic recording (HAMR) system being a next-generation recording technology, the temperature of a head portion of an actuator can locally reach as high as 400° C. Thus, the internal temperature of the HDD rises, and even when low-volatility base oil is used, the amount of volatilization of a lubricant component may not be reduced.

The present inventors have paid attention to the above-described knowledge, that is, the fact that in a HAMR disk drive apparatus, organic impurities can be decomposed by oxygen present inside the apparatus and suppression of read/write errors can be expected. Furthermore, the present inventors have examined, under an environment of a high temperature of 400° C. as in the HAMR system, not only the decomposition of the organic impurities but also the possibility that other organic compounds present in the apparatus may be oxidized to consume oxygen. This results in insufficient decomposition of the organic impurities and inevitable adhesion of the organic impurities to a disk.

The present inventors have further focused on coating (coating film) of a base member applied for dust avoidance as a candidate for another organic compound consuming oxygen, and reconsidered the configuration of the coating film on the basis of the idea that the coating film of the base member consumes no oxygen (avoids taking in oxygen).

The present inventors have come to the possibility that a mode of a coating film overbaked, for example, an overbaked electrodeposition coating film can implement this idea, and at this time, have come up with, as a mode of chemically changing the structure of the coating film, a mode having a predetermined pencil hardness or more and a predetermined glossiness or less, and a mode having the ratio of a peak intensity derived from a resin included in the coating film and a peak intensity derived from a pigment within a specific range when the coating film is subjected to Fourier transform infrared spectroscopy.

Various factors are considered for the relationship between the overbaking of the electrodeposition coating film and a mechanism for suppressing the oxygen uptake, the hardness and glossiness of the film, and the peak intensity ratio of the resin and the pigment constituting the film obtained by the infrared spectroscopy.

For example, overbaking a film containing a resin or the like may result in more crosslinks (bonding) being formed than by predetermined baking. Due to the overbaking (formation of crosslinking), the number of positions capable of forming crosslinking is reduced, resulting in, for example, suppression of uptake of oxygen atoms contributing to the formation of the crosslinking. The formation of the crosslinking (bonding) due to such overbaking is considered to lead to an increase in the hardness of the coating film.

The overbaking may rupture (cut) again crosslinking (bonding) present between molecules constituting the coating film. The cut position of the bonding may change the light absorption wavelength or the amount of light absorption of the coating film. This results in the thought that the chromaticity of the coating film may be changed as compared to the chromaticity before overbaking, the glossiness decreases, or the absorbance spectrum is changed.

The present inventors have confirmed a phenomenon that the hardness of the film increases and the glossiness decreases as a result of overbaking the base member provided with the electrodeposition coating film at a high temperature, and a phenomenon that changes occur in the ratio of the peak intensity derived from the resin and the peak intensity derived from the pigment in the Fourier transform infrared spectroscopic analysis, and have focused on the relationship between the phenomena. The present inventors have assumed that, in the base member with the coating film, when the hardness, the glossiness, or the peak intensity ratio of the coating film falls within a predetermined range, the coating film can be distinguished from an overbaked coating film. As described above, since the oxygen uptake amount (oxygen consumption amount) of the film after the overbaking can be suppressed, the present inventors have come to the possibility that the influence on the decomposition of the organic impurities in the HMAR disk drive apparatus is suppressed, and finally, read/write errors can be suppressed.

The base member according to the disclosure is described below in detail.

The base member (also referred to as a base plate or a base substrate) according to the disclosure is a base member for a heat-assisted magnetic recording disk drive apparatus, and is at least partially covered with a coating film.

The coating film is an overbaked electrodeposition coating film, and the electrodeposition coating film at this time is a film containing an epoxy resin.

Overbaking is understood here to mean the baking of a coating film-forming material (coating material) by supplying energy greater than energy required for desired crosslinking (that is, curing). The overbaking can be caused by excessive heating (baking) time and/or heating (baking) temperature.

For example, in the film containing an epoxy resin, when the heating (baking) temperature required for the coating material is exceeded by 5° C., more particularly 10° C. or more, and/or when the heating (baking) time is exceeded by 20%, the overbaking is presumed to occur. When the heating (baking) temperature is employed as a condition for the overbaking, the overbaking can be expected to proceed quickly, causing industrial advantages.

The coating film may have a pencil hardness of 5H or more, more preferably 6H or more, or alternatively, the coating film may have a glossiness of 10 or less, more preferably 6 or less at an incident angle of 60°.

The coating film of the base member is formed by electrodeposition coating, and as the coating film-forming material used here, for example, a coating film-forming material (paint) containing a resin containing an epoxy resin can be used. In an embodiment, a paint containing an epoxy-based resin or an epoxy-polyamide-based resin can be used. For example, the coating film can be formed by using a cationic electrodeposition paint containing an epoxy resin and employing an electrodeposition coating method generally used for manufacturing the base member.

The paints may contain pigments such as coloring pigments, extender pigments, and rust preventive pigments. Examples of the coloring pigments include black pigments such as carbon black, acetylene black, graphite, iron black, and aniline black, and white pigments such as titanium white, zinc oxide, lithopone, zinc sulfide, and antimony white. Examples of the extender pigments include clay, mica, baryta, kaolin, talc, calcium carbonate, silica, barium sulfate, alumina white, and aluminum silicate. Examples of the rust preventive pigments include aluminum phosphomolybdate, aluminum dihydrogen tripolyphosphate, and zinc oxide.

In the disclosure, the overbaked electrodeposition coating film is particularly a coating film containing a benzene ring-containing epoxy resin and a pigment containing an aluminum silicate component, and when an absorption spectrum of the coating film is measured by Fourier transform infrared spectroscopy, a value of a ratio x of peak intensities calculated from the obtained absorption spectrum by using Equation (1) below is 0.8 or less, more preferably 0.6 or less.

$$x = I_{polymer}/I_{pigment} \quad (1)$$

In Equation (1) above, $I_{polymer}$ represents a value of peak intensity at a wave number corresponding to absorbance derived from the benzene ring of the resin, and $I_{pigment}$ represents a value of peak intensity at a wave number corresponding to absorbance derived from the pigment containing the aluminum silicate component.

For example, when the epoxy resin containing the benzene ring is used as the resin, a peak intensity in the vicinity of wave numbers 1490 cm$^{-1}$ to 1520 cm$^{-1}$ (for example, an intensity at a wave number 1500 cm$^{-1}$ is also referred to as $I_{1500}$, the same applies below) can be employed as $I_{polymer}$.

For example, when the pigment containing the aluminum silicate component is used as the pigment, a peak intensity in the vicinity of wave numbers 995 cm$^{-1}$ to 1010 cm$^{-1}$ (for example, an intensity at a wave number 1000 cm$^{-1}$ is referred to as $I_{1000}$) can be employed as $I_{pigment}$.

The absorption spectrum is obtained by directly measuring an infrared (IR) absorption spectrum of the coating film formed at the base member by an attenuated total reflection (ATR) method using a diamond crystal (prism). In the ATR method, the shape of a spectrum is changed due to the difference in refractive index between a sample and the prism, and ATR correction is generally performed particularly in the case of comparison with data measured by a transmission method. In measurement by infrared spectroscopy (IR method), background (no sample) measurement immediately before sample measurement is generally performed to eliminate the influence of the background due to the atmosphere.

The base member for the heat-assisted magnetic recording disk drive apparatus according to the disclosure can be manufactured by including the following steps, for example.

(A) A film-forming and heating step of coating at least a part of the base member by electrodeposition coating with an epoxy resin-containing paint and heating and curing a coated film by overbaking to form a coating film.

The film-forming and heating step (A) is a step of coating at least a part of the base member by electrodeposition coating and heating and curing the coated film by overbaking.

The coating is performed with a paint containing an epoxy resin. The paint containing an epoxy resin can use, for example, a paint containing an epoxy-based resin or an epoxy-polyamide-based resin, but is not limited to this paint. The paint may contain a pigment such as the above-mentioned coloring pigment, extender pigment, or rust preventive pigment.

In the step (A), conditions for heating temperature and time may be conditions for temperature for heating and curing the coated paint by overbaking, that is, as described above, conditions for temperature and time capable of supplying energy greater than the energy required for desired curing, and can be appropriately selected depending on the type of paint. For example, the overbaking can be performed at a temperature of 200° ° C. or more, or alternatively, 250° C. or more.

In an embodiment, the resin can be thermally cured by immersing the base member in a liquid (electrodeposition paint) including dissolved cationic electrodeposition paint containing an epoxy resin:epoxy-based resin or epoxy-polyamide-based resin, and applying an electric current to adhere the resin to the base member, followed by drying and overbaking by heating at a temperature of, for example, 250° C. or more. However, depending on the constituent material of the coating film, for example, in the case of a coating film containing an epoxy resin, a special attention is required because the coating film may be thermally decomposed at 300° C. or more.

Through the overbaking, the hardness of the coating film increases or the glossiness of the coating film decreases. That is, this makes it possible to obtain a coating film having a pencil hardness of 5H or more or a glossiness of 10 or less at an incident angle of 60°. Though the overbaking, it makes it possible to obtain a coating film having the value of the ratio x ($=I_{polymer}/I_{pigment}$) of peak intensities in the absorption spectrum obtained by Fourier transform infrared spectroscopy of the coating film, the value being 0.8 or less. By setting the overbaking conditions to a higher temperature and/or a longer period of time, a coating film having a pencil hardness of 6H or more or a glossiness of 6 or less at an incident angle of 60° can also be obtained, or a coating film having the value of the ratio x ($=I_{polymer}/I_{pigment}$) of peak intensities can also be obtained, the value being 0.6 or less.

The base member for the heat-assisted magnetic recording disk drive apparatus according to the disclosure can also be manufactured by including the following steps as an example.

(1) A film-forming and first heating step of coating at least a part of the base member by electrodeposition coating with an epoxy resin-containing paint and heating and curing a coated film to form a coating film.

(2) A second heating step of heating the coating film by overbaking at a higher temperature than the first heating step.

(1) The film-forming and first heating step is a step of coating at least a part of the base member by electrodeposition coating and heating and curing the coated film.

The coating may be performed using, for example, the paint mentioned in the step (A).

In the step (1), conditions for heating temperature and time may be temperature and time for curing the coated paint, and may be appropriately selected depending on the type of paint. For example, the coating film can be heated at a temperature of about 200° C., but is not limited to this condition.

In an embodiment, the resin can be thermally cured by immersing the base member in a liquid (electrodeposition paint) including dissolved cationic electrodeposition paint containing an epoxy resin:epoxy-based resin or an epoxy-polyamide-based resin, and applying an electric current to adhere the resin to the base member, followed by drying and heating.

(2) The second heating step is a step of heating the coating film at a higher temperature than the first heating step, that is, an overbaking step.

This step can be performed at a temperature of, for example, 250° C. or more. However, depending on the constituent material of the coating film, for example, in the case of a coating film containing an epoxy resin, a special attention is required because the coating film may be thermally decomposed at 300° C. or more.

By this step, an overbaked coating film can be obtained, and a coating film having the above-described pencil hardness, glossiness, and specific intensity ratio x can be obtained.

Preferred embodiments of the base member of the disclosure, a spindle motor, and a disk drive apparatus provided with the spindle motor are described below with reference to the accompanying drawings. Note that various embodiments described below are exemplary embodiments of the disclosure, and the disclosure is not limited to the embodiments.

Base Member

Figure 1B:
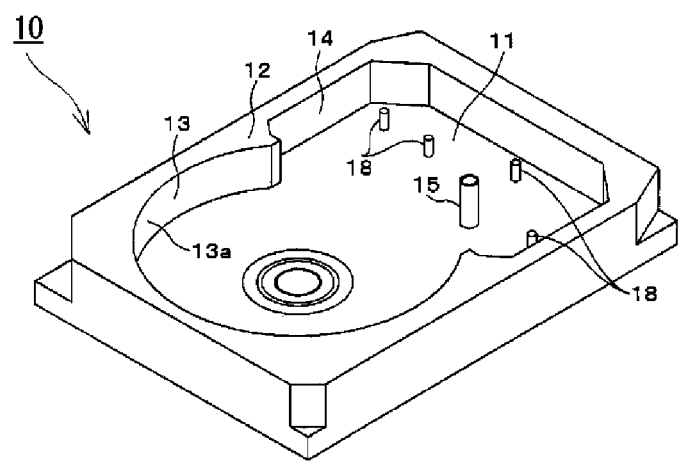

FIGS. 1A and 1B are schematic views each for explaining a configuration of a base member according to an embodiment of the disclosure, wherein FIG. 1A is a plan view and FIG. 1B is a perspective view.

As illustrated in FIGS. 1A and 1B, a base member 10 has a substantially rectangular box shape, that is, includes a rectangular plate-like bottom portion 11 having short sides and long sides, and a side wall portion 12 formed around the bottom portion 11 and extending in a direction orthogonal to the bottom portion 11. The base member 10 is generally manufactured by die casting of aluminum, and is provided with the above-mentioned predetermined coating film according to the disclosure.

The side wall portion 12 includes a circular portion 13 having an inner circumferential surface shape formed along a shape of a hard disk, and a rectangular portion 14 having a rectangular shape and configured to accommodate a mechanism for writing and reading data to and from the hard disk. In the die-casted state, inner circumferential surfaces of the circular portion 13 and the rectangular portion 14 are inclined so as to slightly expand upward, corresponding to the draft of a mold. The inner circumferential surface (disk opposing surface) of the circular portion 13 is machined to form a machined surface (machined portion) 13a orthogonal to the bottom portion 11. The machined surface 13a has a predetermined uniform distance from an outer peripheral edge of the hard disk.

In FIG. 1, a shaft 15 is a shaft used when the base member 10 is used in a hard disk drive apparatus, and supports 18 are supports for fixing a data reading/writing mechanism of the hard disk drive apparatus.

As an example, screw holes may be formed at the bottom portion 11 of the base member 10, and the shaft 15 and the supports 18 may be attached to the screw holes and may be fixedly press-fitted into recess parts or through holes formed at the bottom portion 11 of the base portion 10.

Alternatively, when the base member 10 is used in a hard disk drive apparatus enclosed inside with a low-density gas such as helium gas, the shaft 15 and the supports 18 may be die-casted integrally with the base member 10 to avoid leakage of the gas.

Spindle Motor

Figure 2:
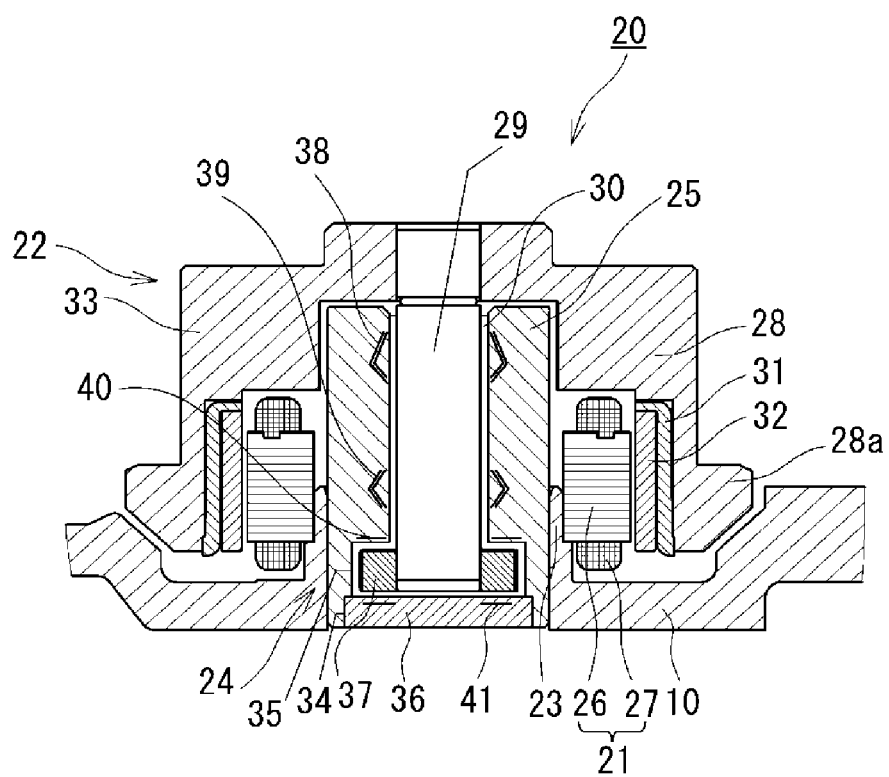
FIG. 2 is a conceptual view for explaining an example of a main component structure of a spindle motor of the disclosure.

FIG. 2 is a schematic view for explaining a spindle motor according to an embodiment of the disclosure. As illustrated in FIG. 2, a spindle motor 20 is used as a motor for driving a data storage device including a magnetic disk, an optical disk, or the like used in a computer. As a whole, the spindle motor 20 includes a stator assembly 21 and a rotor assembly 22. Although the spindle motor 20 in FIG. 2 is a shaft rotating motor, the disclosure is also applicable to a shaft fixed motor.

The stator assembly 21 is fixed to a housing constituting a casing of the data storage device, that is, fixed to a cylindrical portion 23 provided at the base member 10 to protrude upward. A stator core 26 wound around with a stator coil 27 is fitted and attached to an outer circumferential portion of the cylindrical portion 23.

The rotor assembly 22 includes a rotor hub 28, and the rotor hub 28 is fixed to an upper end part of a shaft 29 and rotates together with the shaft 29. The shaft 29 is inserted into a sleeve 25 being a bearing member, and is rotatably supported by the sleeve 25. The sleeve 25 is fitted and fixed inside the cylindrical portion 23. A lower cylindrical portion 28a of the rotor hub 28 rotates inside the base member 10 being a housing, but a back yoke 31 is mounted on an inner circumferential surface of the lower cylindrical portion 28a, and a rotor magnet 32 is further fitted and fixed inside the back yoke 31 and is magnetized to a plurality of poles of N and S poles.

When the stator coil 27 is energized, a magnetic field is formed by the stator core 26, and this magnetic field acts on a rotor magnet 32 disposed in the magnetic field to rotate the rotor assembly 22. On an outer circumferential surface of an intermediate cylindrical portion 33 of the rotor hub 28 of the rotor assembly 22, a recording disk, for example, a magnetic disk (not illustrated) constituting a storage portion of the data storage device is mounted, and is rotated or stopped by the operation of the spindle motor 20, so that information writing and data processing are performed by a recording head (not illustrated).

In the spindle motor 20 of such an embodiment, a fluid dynamic pressure bearing 24 is provided at a portion where the sleeve 25 rotatably supports the shaft 29.

A large-diameter first recess 34 opening downward is formed at a lower end part of the sleeve 25, and a small-diameter second recess 35 is formed at a top surface of the first recess 34. A counter plate (thrust receiving plate) 36 is fitted into the large-diameter first recess 34 and fixed to the first recess 34 by a mechanism such as welding or bonding, so that the inside of the sleeve 25 is in an airtight state.

A thrust washer 37 is fitted, press-fitted and fixed to a lower end part of the shaft 29, and the thrust washer 37 is disposed in the second recess 35 of the sleeve 25 to rotate together with the shaft 29 while opposing the counter plate 36 and a top surface of the second recess 35.

A gap between the sleeve 25 and the shaft 29, a gap between the thrust washer 37 and the second recess 35, and a gap between the thrust washer 37/the shaft 29 and the counter plate 36 communicate with one another, and fluid dynamic pressure bearing oil 30 is sealed in the communication gaps. The fluid dynamic pressure bearing oil 30 is injected from between the sleeve 25 and the shaft 29.

A first radial dynamic pressure groove 38 and a second radial dynamic pressure groove 39 for generating dynamic pressure are formed at an inner circumferential surface of the sleeve 25 opposing the shaft 29 to be spaced apart from each other in an axial direction. Due to the rotation of the shaft 29, the radial dynamic pressure grooves 38 and 39 generate dynamic pressure causing the shaft 29 and the sleeve 25 to be in a non-contact state in a radial direction. A first thrust dynamic pressure groove 40 and a second thrust dynamic pressure groove 41 are formed at the top surface of the second recess 35 opposing an upper end surface of the thrust washer 37 and an upper end surface of the counter plate 36 opposing a lower end surface of the thrust washer 37, respectively. Due to the rotation of the shaft 29, the thrust dynamic pressure grooves 40 and 41 generate dynamic pressure for stably floating the shaft 29 in a thrust direction. Due to the operation of the dynamic pressure grooves, the shaft 29 can stably rotate at a high speed in the non-contact state with respect to the sleeve 25. As the dynamic pressure grooves, known patterns such as herringbone grooves and spiral grooves can be used.

Disk Drive Apparatus

Figure 3:
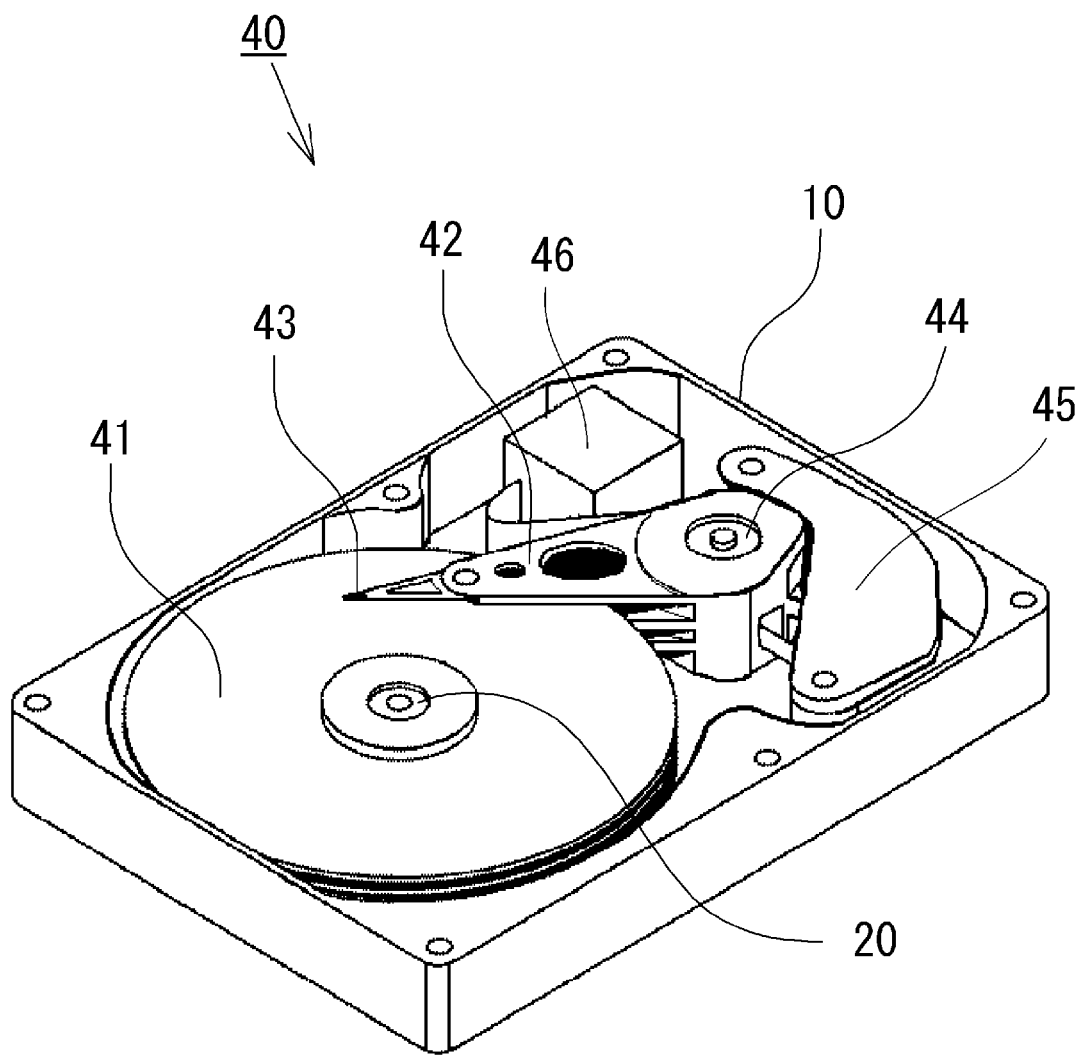
FIG. 3 is a schematic view for explaining an example of the structure of a drive apparatus (disk drive apparatus) provided with the spindle motor of the disclosure.

FIG. 3 is a perspective view illustrating an overall configuration of a hard disk drive apparatus 40 using the spindle motor according to the present embodiment.

As illustrated in FIG. 3, the disk drive apparatus 40 according to the present embodiment includes the above-described base member 10 (base plate) having a substantially rectangular box shape, the spindle motor 20 placed on the base member 10, a magnetic disk 41 rotated by the spindle motor 20, a swing arm 42 having a magnetic head 43 for writing information at a predetermined position of the magnetic disk 41 and reading information from an arbitrary position, a pivot assembly bearing device 44 for swingably supporting the swing arm 42, an actuator 45 for driving the swing arm 42, and a controller 46 for controlling the components.

The disk drive apparatus according to the disclosure employs a heat-assisted magnetic recording (HAMR) system as a recording system. In the disk drive apparatus employing the heat-assisted magnetic recording (HAMR) system, the temperature of a head portion of an actuator may locally reach a high temperature of 400° C.

The disk apparatus can be a disk drive apparatus including nine or more magnetic disks each having a diameter of 3.5 inches, for example. In such an apparatus having a large number of disks, a spatial volume in the apparatus is further reduced.

The disclosure is not limited to the embodiment and specific examples described in the present specification, and various changes and variations can be made within the scope of the technical idea described in the claims.

Examples

The disclosure is described below in more detail with reference to examples. However, the disclosure is not limited to the examples.
Evaluation of Base Member
Aluminum being a material of the base member was subjected to electrodeposition coating with a paint containing an epoxy resin and an aluminum silicate component, and was heated and cured to obtain a coating film.

The coating film was overbaked by heating (a) at 285° C. for 40 minutes or (b) at 285° C. for 60 minutes.
(1) Glossiness
In each of before and after the overbaking, the glossiness of the above-described base member at an incident angle of 60° was measured using a gloss checker IG-320 (manufactured by Horiba, Ltd.) (10 positions for each).

The results obtained are shown in Table 1 below.

TABLE 1

Table 1 Glossiness at incident angle of 60°
Overbaking conditions

| (a) Temperature: 285° C., 40 minutes | | | (b) Temperature: 285° C., 60 minutes | | |
|---|---|---|---|---|---|
| | Glossiness | | | Glossiness | |
| NO. | Before baking | After baking | NO. | Before baking | After baking |
| 1 | 31.2 | 5.8 | 1 | 32.3 | 5.1 |
| 2 | 29.3 | 6.7 | 2 | 35 | 5.4 |
| 3 | 32.2 | 6.2 | 3 | 31.9 | 5.4 |
| 4 | 32.6 | 6.5 | 4 | 34.1 | 5 |
| 5 | 31.7 | 5.3 | 5 | 32.2 | 5.8 |
| 6 | 31.9 | 5.3 | 6 | 32.9 | 5.2 |
| 7 | 32.2 | 5.7 | 7 | 31.3 | 5.2 |
| 8 | 31.1 | 6 | 8 | 32.7 | 5.1 |
| 9 | 32.7 | 6.3 | 9 | 33.5 | 5.1 |
| 10 | 30.7 | 6.5 | 10 | 32.5 | 4.8 |

As shown in Table 1 above, the glossiness of the coating film after the overbaking decreased, and the coating film had a glossiness of 10 or less. The amount of oxygen uptake (oxygen consumption) of the coating film can be expected to be suppressed by the overbaking.
(2) Pencil Hardness
The pencil hardness of the coating film after the overbaking ((a) at 285° C., for 40 minutes and (b) at 285° C., for 60 minutes) was measured in accordance with JIS K 5600. The pencil hardness of the coating film after the overbaking was 6H in all cases.
(3) Fourier Transform Infrared Spectroscopy (FTIR) Measurement The IR absorption spectra of the coating films in each of before and after the overbaking ((b) 285° C., 60 minutes) were directly measured by the ATR method using a diamond crystal. The obtained absorption spectra are shown in FIGS. 4A and 4B (FIG. 4A: before the overbaking and FIG. 4B: after the overbaking (285° C., 60 minutes)).

Figure 4A:
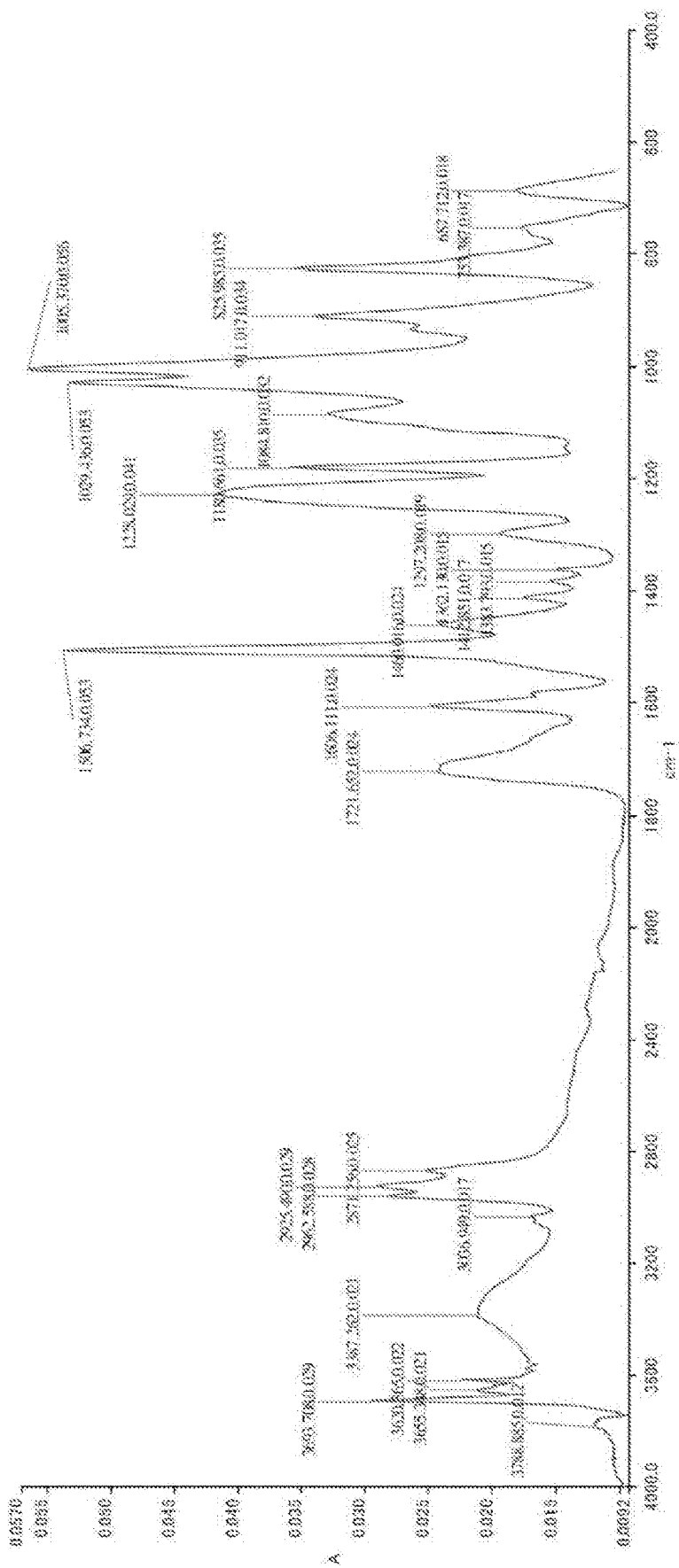
FIGS. 4A and 4B are diagrams each showing an absorption spectrum of a coating film of the base member measured in examples by Fourier transform infrared spectroscopy (FIG. 4A: before overbaking and FIG. 4B: after overbaking (285° C., 60 minutes)).
Figure 4B:
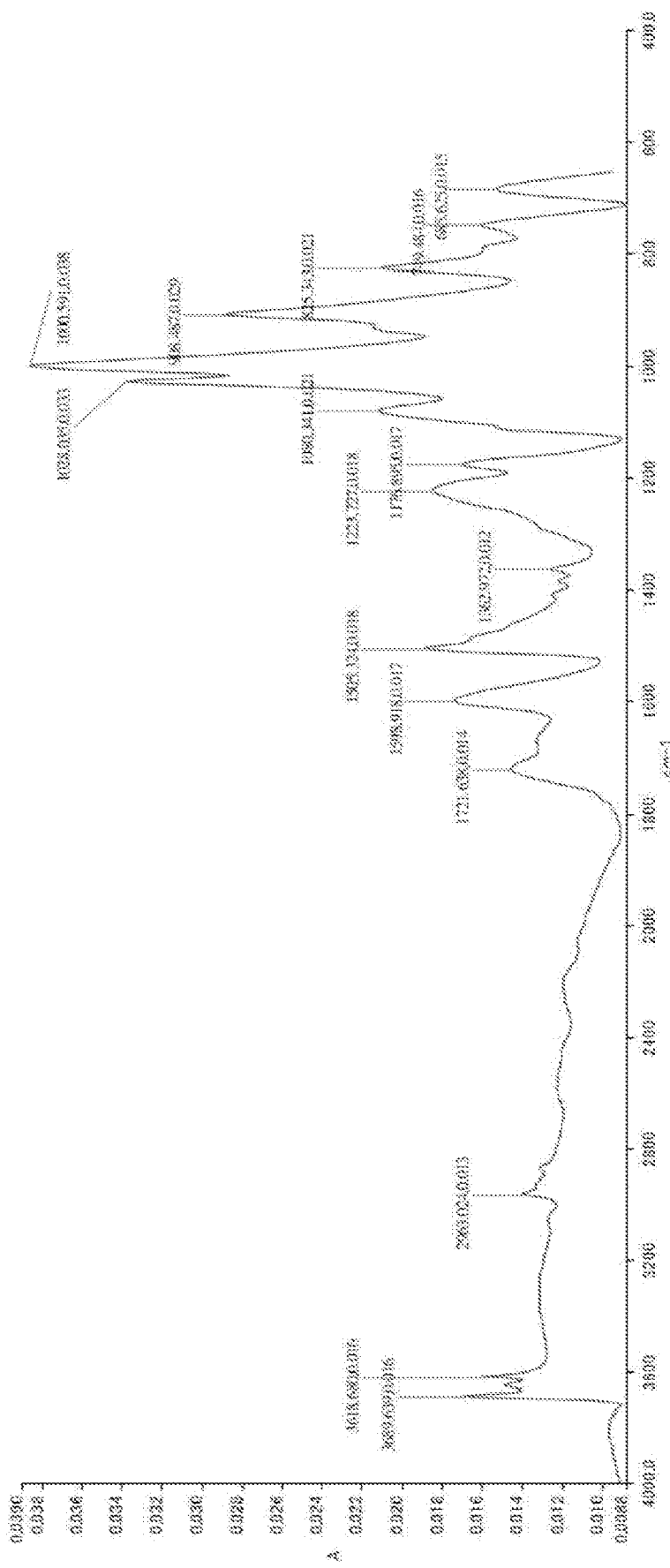

In FIGS. 4A and 4B, peaks at wave numbers 1490 cm$^{-1}$ to 1520 cm$^{-1}$ can be identified as peaks derived from the epoxy resin, and peaks at wave numbers 995 cm$^{-1}$ to 1010 cm$^{-1}$ can be identified as peaks derived from the pigment. As shown in FIGS. 4A and 4B, according to comparison between before the overbaking (FIG. 4A) and after the overbaking (FIG. 4B), a peak intensity derived from the epoxy resin can be confirmed to be significantly lower than a peak intensity derived from the pigment.

When the ratio ($x=I_{polymer}/I_{pigment}$) of the peak intensities before and after the overbaking was calculated from the intensities of the peaks derived from the epoxy resin and the peaks derived from the pigment, x was 0.90 before the overbaking (FIG. 4A) and was 0.41 after the overbaking (FIG. 4B).

The best embodiments have been described in detail above, but the disclosure is not limited to the embodiments described above, and variations, modifications, and the like within a range achieving the object of the disclosure are included in the disclosure.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:
1. A base member for a heat-assisted magnetic recording disk drive apparatus, the base member comprising:
a coating film coating at least a part of the base member, wherein
the coating film is an epoxy resin-containing electrodeposition coating film overbaked,
wherein
the coating film contains a benzene ring-containing epoxy resin and a pigment containing an aluminum silicate component, and
a value of a ratio x of peak intensities calculated using Equation (1) below is 0.8 or less in an absorption spectrum of the coating film obtained by Fourier transform infrared spectroscopy,

$$x = I_{polymer}/I_{pigment} \quad (1)$$

(where $I_{polymer}$ represents a value of peak intensity at a wave number corresponding to absorbance derived from a benzene ring, and $I_{pigment}$ represents a value of peak intensity at a wave number corresponding to absorbance derived from a pigment containing an aluminum silicate component).

2. The base member for a heat-assisted magnetic recording disk drive apparatus, according to claim 1, wherein the coating film has a pencil hardness of 5H or more.

3. The base member for a heat-assisted magnetic recording disk drive apparatus, according to claim 1, wherein the coating film has a glossiness of 10 or less at an incident angle of 60°.

4. A spindle motor comprising:
the base member according to claim 1.

5. A heat-assisted magnetic recording disk drive apparatus comprising:
the spindle motor according to claim 4.

* * * * *